(12) United States Patent
Xu

(10) Patent No.: US 6,561,081 B2
(45) Date of Patent: May 13, 2003

(54) AUTOMATIC BREAD SLICE-TOASTING OVEN

(76) Inventor: Hairong Xu, Room 401, Building 11, Zhuyuan Ganxiusuo Meibuayuan, Guangzhou City, Guangdong Province 510510 (CN)

( * ) Notice: Subject to any disclaimer, the term of this patent is extended or adjusted under 35 U.S.C. 154(b) by 0 days.

(21) Appl. No.: 10/164,732

(22) Filed: Jun. 6, 2002

(65) Prior Publication Data

US 2002/0189465 A1 Dec. 19, 2002

(30) Foreign Application Priority Data

Jun. 14, 2001 (CH) .......................... 01242128 U

(51) Int. Cl.[7] .................. A47J 27/62; A47J 37/04; A47J 37/08; H05B 1/02; F27D 11/00
(52) U.S. Cl. .................. 99/326; 99/331; 99/385; 99/386; 99/387; 99/389; 99/391; 219/404; 219/413; 219/521
(58) Field of Search ............... 99/327–333, 385–393, 99/399, 427; 219/404, 492, 405, 494, 409, 497, 411, 386, 521, 391, 524; 392/423, 425

(56) References Cited

U.S. PATENT DOCUMENTS

| | | | | |
|---|---|---|---|---|
| 3,669,004 A | * | 6/1972 | Eaton, Jr. et al. | 99/331 |
| 3,693,538 A | * | 9/1972 | Synder | 99/447 |
| 3,800,691 A | * | 4/1974 | Eaton, Jr. et al. | 99/391 |
| 4,441,015 A | * | 4/1984 | Eichelberger et al. | 99/447 X |
| 4,455,479 A | * | 6/1984 | Itoh et al. | 99/447 X |
| 4,727,799 A | * | 3/1988 | Ohshima et al. | 99/331 |
| 4,734,562 A | * | 3/1988 | Amano et al. | 219/386 X |
| 5,045,660 A | * | 9/1991 | Levinson | 99/483 X |
| 5,390,588 A | * | 2/1995 | Krasznai et al. | 99/389 |
| 6,091,057 A | * | 7/2000 | Asami et al. | 219/404 |
| 6,242,716 B1 | * | 6/2001 | Wang | 219/404 |
| 6,267,044 B1 | * | 7/2001 | Friel, Sr. | 99/327 |
| 6,337,466 B1 | * | 1/2002 | Chasen | 99/392 X |

* cited by examiner

*Primary Examiner*—Timothy F. Simone
(74) *Attorney, Agent, or Firm*—Schwegman, Lundberg, Woessner & Kluth

(57) ABSTRACT

An automatic bread slice-toasting oven comprises a case, a toasting chamber, a guide rail form toasting shelf, an electrical transmission mechanism and a timing control circuit. A push rod provided with push claws is provided beneath the toasting shelf, the push claws are hinged to the two ends of the push rod via pivot pins respectively, the push rod is connected to the transmission mechanism. The motor rotates in the positive and negative directions by the controlling of the timing control circuit so as to reciprocate the push rod, so that the front claw on the push rod pushes the toasted bread slice out of the toasting chamber and the rear claw pushes a bread slice to be toasted into the toasting chamber. The toasting can be carried out automatically, continuously and alternatively by setting the time period of toasting with safety and convenience, thus increasing the efficiency of toasting greatly and ensuring the quality of the toasted bread slice.

6 Claims, 4 Drawing Sheets

AUTOMATIC BREAD SLICE-TOASTING OVEN

CLAIM OF PRIORITY

This application claims priority under 35 U.S.C. 119 from People's Republic of China Application No. 01242128.6, filed Jun. 14, 2001, which application is incorporated herein by reference.

BACKGROUND OF THE INVENTION

1. Technical Field

The present invention relates to electric oven technology, and more particularly, to an automatic electric oven for toasting slices of bread.

2. Description of the Prior Art

A conventional toasting oven is generally vertical, that is, the oven opens upward, and the operator puts bread slices in the oven or takes them out of the oven manually, thus the efficiency is low and the bread slice tends to be singed because of carelessness during toasting.

SUMMARY OF THE INVENTION

An object of the present invention is to overcome disadvantages of the conventional toasting oven, and accordingly to provide an oven, which can toast bread slices automatically and continuously. So that complicated manual operations are eliminated, thus ensuring the quality of the toasting bread slices and increasing the toasting efficiency.

The object of the present invention is accomplished by providing an automatic bread slice-toasting oven comprising a case, a pedestal, a toasting chamber, reflecting plates, a toasting shelf and a timing circuit; the case is disposed on the upper left of the pedestal; the upper part of the toasting chamber is surrounded by the case, the lower part thereof is located in the pedestal; the toasting chamber is formed by clasping an upper reflecting disc plate with a lower reflecting disc plate above the pedestal horizontally, the upper reflecting plate is connected to the upper inner part of the case and opens downward, the lower reflecting plate is connected to the upper inner left part of the pedestal via supports and opens upward; plural electric heating tubes provided between the upper reflecting plate and the lower reflecting plate are disposed in parallel and horizontally to span the toasting chamber; the case is provided with a front door and a rear door, the front part of the toasting shelf in the guide rail form extends into the toasting chamber through the bottom of the front door and is fixed to the lower reflecting plate, the rear part thereof is outside the toasting chamber and being supported on the pedestal; the toasting shelf in the guide rail form is provided with a front colliding block, a middle colliding block and a rear colliding block at the front end, the middle part and the rear end thereof respectively; a push rod parallel to the toasting shelf is provided in the pedestal beneath the toasting shelf, the push rod moves in parallel to the plane of the toasting shelf in the guide rail form. The push rod is provided with a front push claw and a rear push claw, the front push claw is hinged to the front end of the push rod via a pivot pin, and the rear push claw is hinged to the rear end of the push rod via a pivot pin. A sliding block and an electrical transmission mechanism are provided in the pedestal. The rear end of the push rod is connected to the upper part of the sliding block, the electrical transmission mechanism is disposed beneath the sliding block; the input of the motor of the electrical transmission mechanism is connected to the output of the timing control circuit.

The electrical transmission mechanism comprises a motor, a toothed shaft and a guide shaft; the toothed shaft and the guide shaft are fixed to the pedestal horizontally and parallel to each other at both ends thereof via fixing supports and fixing seats respectively. The toothed shaft and the guide shaft pass through the sliding block, the motor is mounted on the sliding block, and a gear is mounted on the output shaft of the motor so as to mesh with the toothed shaft.

The electrical transmission mechanism comprises a motor, a screw and a sliding block nut. The motor is fixed on the left in the pedestal via a fixing support, the output shaft of the motor is connected to one end of the screw, and the other end of the screw is fixed in a fixing seat on the right in the pedestal, the rear end of the push rod is connected to the upper part of the sliding block nut.

An entrance height adjusting plate is provided at the door of the case.

A tray for receiving breadcrumbs is provided between the lower reflecting plate and the toasting shelf in the guide rail form in the lower part of the toasting chamber.

The timing of the toasting is automatically determined by the motor continuously driving th push rod back and forth. Thus the present invention provides an efficient, clean, and convenient method of toasting bread slices.

BRIEF DESCRIPTION OF DRAWINGS

The present invention will be described in detail with reference to the drawings, in which.

DETAILED DESCRIPTION OF THE PRESENT INVENTION

Referring to the FIGS, the present invention will be described in detail thereafter.

Figure 1:
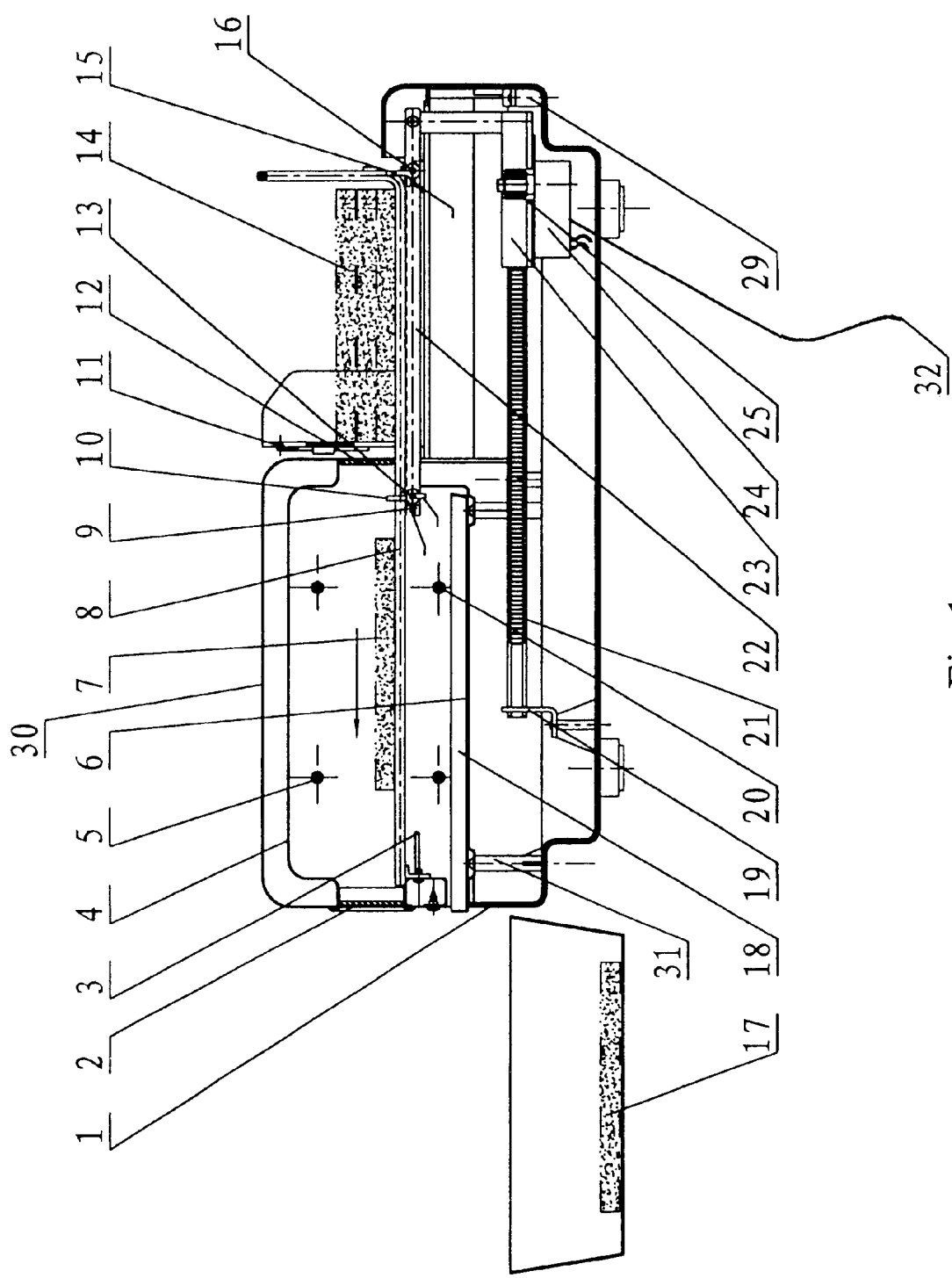
FIG. 1 is a sectional front view showing the structure of an automatic bread slice-toasting oven according to an embodiment of the present invention.
Figure 2:
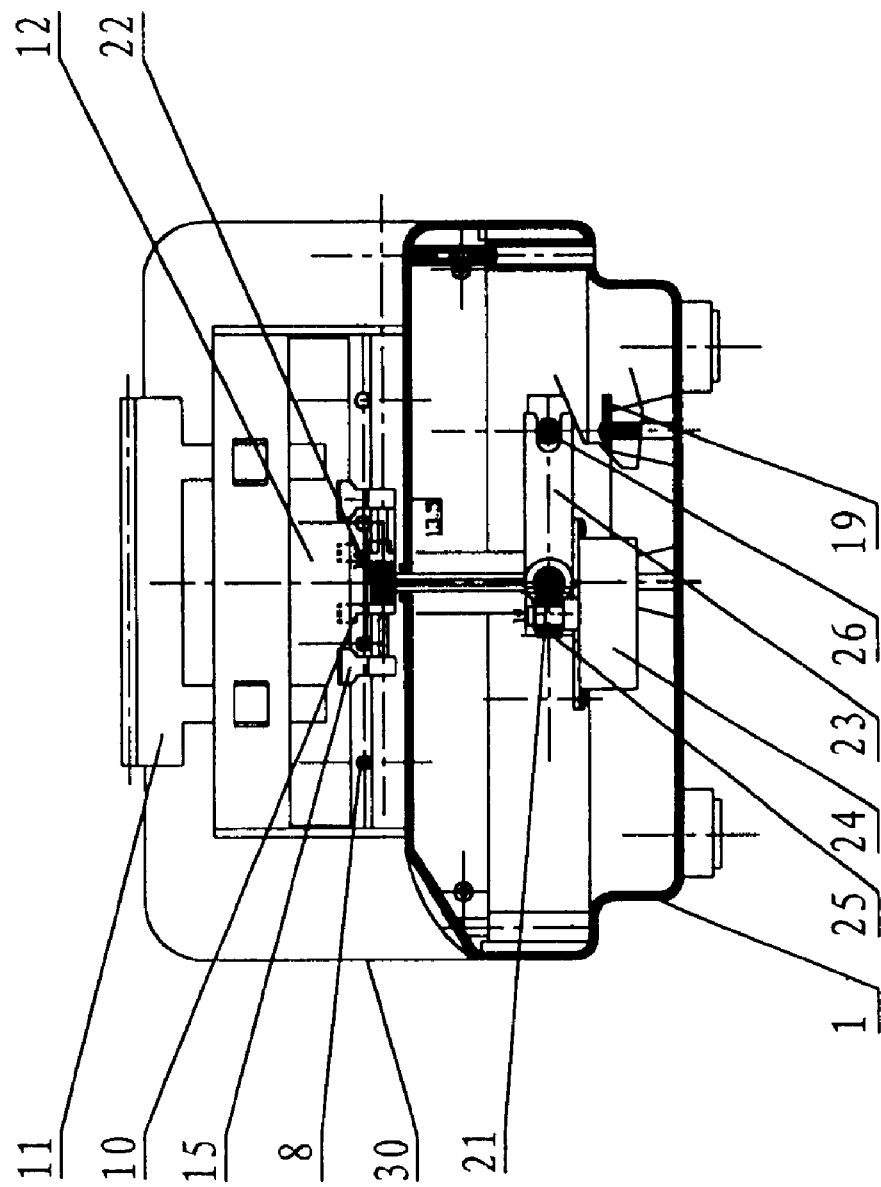
FIG. 2 is a sectional side view showing the structure of the automatic bread slice-toasting oven in FIG. 1.
Figure 3:
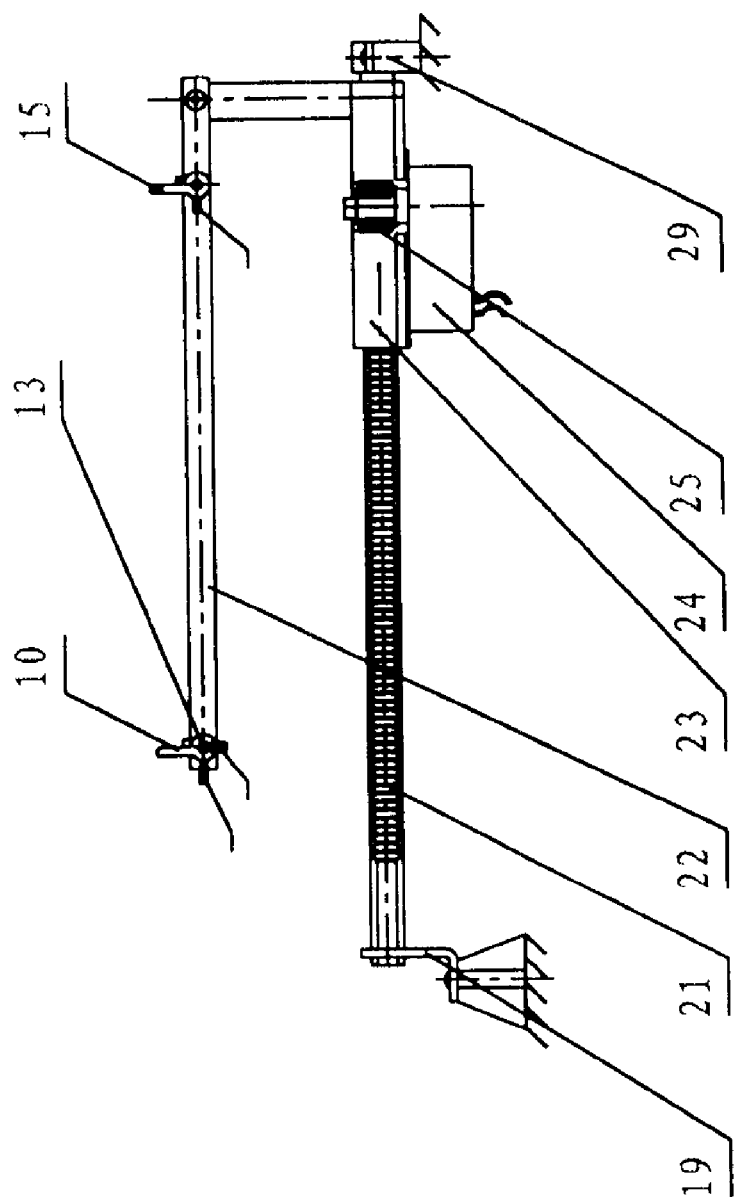
FIG. 3 is a view schematically showing the structure of the transmission mechanism in FIG. 1.

As shown in FIGS. 1 to 3, the present application includes an automatic bread slice-toasting oven comprising a case 30, a pedestal 1, a toasting chamber, reflecting plates 4 and 6, toasting shelf 8 in the guide rail form, electric heating tubes 5 and 20, a push rod 22, and an electrical transmission mechanism. The case 30 is disposed on the upper left of the pedestal 1; the upper part of the toasting chamber is enclosed by the case 30, the lower part thereof is disposed in the pedestal 1. The toasting chamber is formed by clasping an upper reflecting disc plate 4 with a lower reflecting disc plate 6 above the pedestal horizontally, the upper reflecting plate 4 is connected to the upper inner part of the case 30 and opens downward, the lower reflecting plate 6 is connected to the upper inner left part of pedestal 1 via supports 31 and opens upward; plural electric heating tubes 5 and 20 provided between the upper reflecting plate and the lower reflecting plate are disposed horizontally and in parallel to span the toasting chamber; the case 30 is provided with a front door 12 and a rear door 2, the front part of the toasting shelf 8 in the guide rail form extends into the toasting chamber through the bottom of the front door 12 and is fixed to the lower reflecting plate 6, the rear part thereof is outside the toasting chamber for placing the bread slices 14 to be toasted thereon; the toasting shelf 8 in the guide form are provided with a front colliding block 3, a middle colliding block 9 and a rear colliding block 16 at the front end, the middle part and the rear end thereof respectively; a push rod 22 parallel to the toasting shelf 8 is provided in the pedestal 1 beneath the toasting shelf 8, the push rod 22 is provided with a front push claw 10 and a rear push claw 15, the front push claw 10 is hinged to the front end of the push rod 22 via a pivot pin 13, the rear push claw 15 is also hinged to the rear end of the push rod 22 via a pivot pin. Also provided in the pedestal 1 are a sliding block 23 and an electrical transmission mechanism; the rear end of the push rod 22 is connected to the upper part of the sliding block 23, a toothed shaft 21 and a guide shaft 26 pass through the lower part of the sliding block 23. The toothed shaft 21 and the guide shaft 26 are fixed to the pedestal 1 horizontally and in parallel at both ends thereof via a fixing support 19 and a fixing seat 29 respectively; a motor 24 is mounted on the sliding block 23, and a gear 25 is mounted on the output shaft of the motor 24 so as to mesh with the toothed shaft 21; an entrance height adjusting plate 11 is provided at door 12 of the case 30; a tray 18 for receiving breadcrumbs is provided between the lower reflecting plate 6 and the toasting shelf 8 in the guide rail form in the lower part of the toasting chamber.

The motor is controlled by a timing control circuit 32, and can rotate in the positive and the negative directions. When the motor 24 rotates in the positive direction, the gear 25 is meshed with the toothed shaft 21 so as to move the sliding block 23 and the push rod 22 in parallel to the plane of the toasting shelf 8 and leftward in FIG. 1, the rear push claw 15 on the push rod 22 pushes a bread slice 14 lying horizontally on the toasting shelf 8 into the toasting chamber so as to toast it, then the front push claw 10 pushes the toasted bread slice 14 out of the toasting chamber and into a mesh basket 17, the front colliding block 3 at the front end of the toasting shelf 8 inside the toasting chamber touches point A at the bottom of the push claw 10, SO that the front push claw 10 is made to turn left around the pivot pin 13 by 90° in FIG. 1, thus lying horizontally in the upper plane of the toasting shelf 8. Then, the timing control circuit controls the motor 24 to rotate in the negative direction, and the push rod 22 returns rightward, since the front push claw 10 lies horizontally, it can not touch the bread slice 7 being toasted, when the push rod 22 arrives the predetermined position, the middle colliding block 9 touches point B at the bottom of the front push claw 10, so that the front push claw 10 is made to turn right around the pivot point 13 by 90° in FIG. 1 and return the front push claw to an upright position. At the same time, the rear push claw 15 is knocked down when it arrives at the front door 12, thus lying horizontally in the upper plane of the toasting shelf 8, therefore, it can not touch the bread slice 14 to be toasted. When the rear push claw 15 returns to the initial position, the rear colliding block 16 touches point C at the bottom of the rear push claw 15, so that it is made to turn right around the pivot point pin 13 by 90° in FIG. 1 and return the rear push claw to an upright position. After the bread slice 7 is toasted, another bread slice to be toasted is pushed into the toasting chamber, thus a bread slice is pushed into and out of the toasting chamber in one operation.

Figure 4:
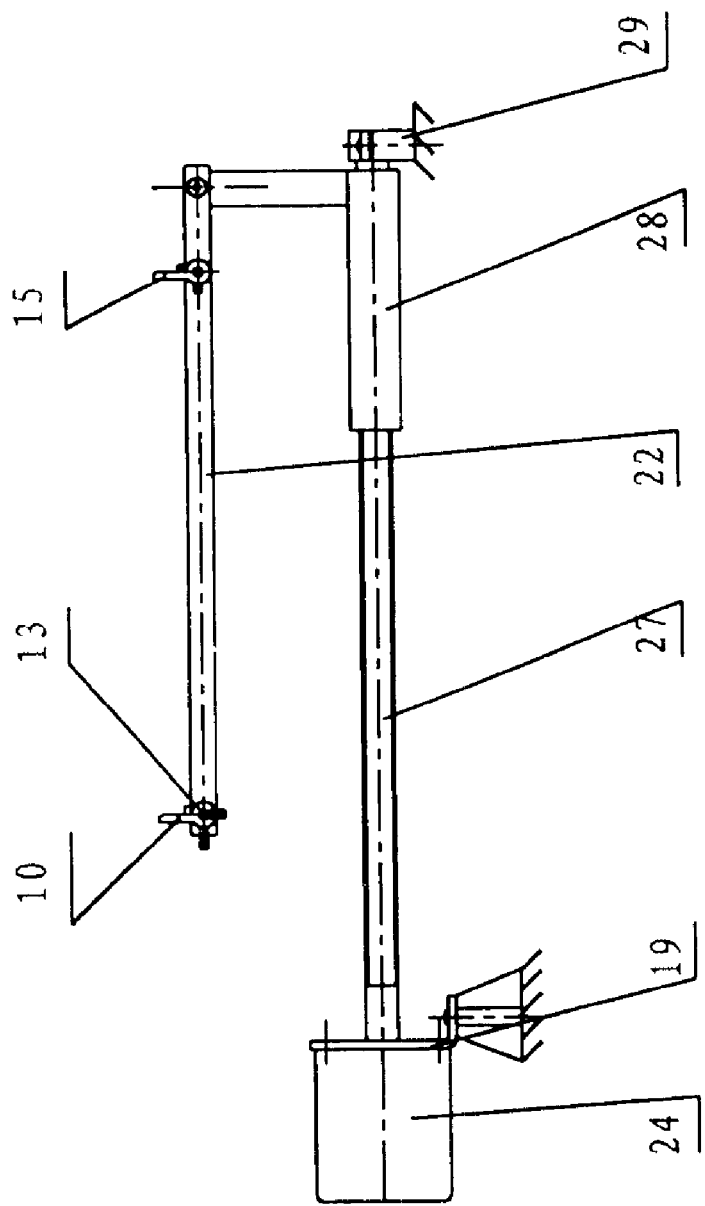
FIG. 4 is a view schematically showing the structure of the transmission mechanism according to another embodiment of the present invention.

FIG. 4 shows another embodiment of the transmission mechanism of the present invention.

As shown in FIG. 4, the motor 24 is fixed at the left inner side of the pedestal 1 via the fixing support 19 and the output shaft of the motor 24 is coupled to one end of the screw 27. The other end of the screw 27 is fitted into the fixing seat 29 at the right side of the pedestal 1. The screw 27 passes through and engages the sliding block nut 28. The upper part of the sliding block nut 28 is connected to the rear end of the push rod 22 and the input of the motor is connected to the control circuit (not shown). The motor 24 rotates in the positive and negative directions so as to rotate the screw 27 and move the sliding block nut 28 from side to side. Thus, the push rod 22 reciprocates linearly so as to push the bread slice to be toasted into and out of the toasting chamber.

The toasting is automatical and continuous. The time period of toasting is adjusted safely and conveniently. Thus the present invention increases the efficiency of toasting and promotes the quality of the toasted bread.

What is claimed is:

1. An automatic bread slice-toasting oven, comprising:
   a case,
   a pedestal,
   a toasting chamber,
   an upper reflecting plate,
   a lower reflecting plate,
   a toasting shelf,
   a timing control circuit;
   wherein said case is disposed on an upper left of the pedestal;
   wherein an upper part of the toasting chamber is surrounded by the case, and a lower part thereof is located in the pedestal;
   wherein said toasting chamber is formed by clasping the upper reflecting plate with the lower reflecting plate above the pedestal horizontally,
   wherein the upper reflecting plate is connected to an upper inner part of the case and opens downward,
   wherein the lower reflecting plate is connected to an upper inner left part of the pedestal via supports and opens upward;
   plural electric heating tubes are provided between the upper reflecting plate and the lower reflecting plate and disposed in parallel and horizontally to span the toasting chamber;
   wherein said case is provided with a front door and a rear door, a forepart of the toasting shelf in the guide rail form extends into the toasting chamber through the bottom of the front door and is fixed to the lower reflecting plate, the a rear part of the toasting shelf is outside the toasting chamber and being supported on the pedestal; the toasting shelf in the guide rail form is provided with a front colliding block at the front end, a middle colliding block at the middle part, and a rear colliding block at the rear end;
   a push rod parallel to the toasting shelf is provided in the pedestal beneath the toasting shelf, the push rod can move in the plane of the toasting shelf in parallel to the guide rail form and is provided with a front push claw and a rear push claw, wherein the front push claw is hinged to a front end of the push rod via a pivot pin, and wherein the rear push claw is hinged to a rear end of the push rod via a pivot pin;
   a sliding block, wherein the rear end of the push rod is connected to the upper part of the sliding block; and
   an electrical transmission mechanism disposed beneath the sliding block, wherein the electrical transmission mechanism includes:
   a motor; and
   a timing control circuit, wherein the input of the motor is connected to the output of the timing control circuit.

2. The automatic bread slice-toasting oven according to claim 1, wherein said electrical transmission mechanism comprises:
   a motor;
   a gear;
   a toothed shaft; and
   a guide shaft, wherein the toothed shaft and the guide shaft are fixed horizontally and parallel to each other to the pedestal at both ends thereof via fixing supports and fixing seats respectively, the toothed shaft and the guide shaft pass through the sliding block, the motor is mounted on the sliding block, and the gear is mounted on the output shaft of the motor so as to mesh with the toothed shaft.

3. The automatic bread slice-toasting oven according to claim 1, wherein said electrical transmission mechanism comprises:
   a motor, wherein the motor includes an output shaft;
   a screw; and
   a sliding block nut, wherein the motor is fixed on the left in the pedestal via a fixing support, the output shaft of the motor is connected to one end of the screw, and the other end of the screw is fixed in a fixing seat on the right in the pedestal, the rear end of the push rod is connected to an upper part of the sliding block nut.

4. The automatic bread slice-toasting oven according to claim 1, wherein the front door of the case includes an entrance height adjusting plate.

5. The automatic bread slice-toasting oven according to claim 1, wherein the lower part of the toasting chamber includes a tray for receiving breadcrumbs located in the guide rail form between the lower reflecting plate and the toasting shelf.

6. An apparatus for toasting bread, the apparatus comprising:
   a toasting shelf;
   a toasting chamber coupled to the toasting shelf, wherein the toasting chamber includes:
      a case, wherein the case covers a portion of the toasting shelf, such that one end of the toasting shelf is covered with the case and another other end is uncovered;
      heating elements disposed inside the case;
   a push rod, coupled to the toasting shelf and movable in a first and a second direction in the plane of the toasting shelf;
   a first and second push claw coupled to the push rod and fold-able in one direction, wherein the movement of the push rod in the plane of the toasting shelf in the first direction concurrently causes the first push claw to move a slice of bread from the uncovered end of the toasting shelf into the toasting chamber for toasting and the second push claw to move a slice of toasted bread out of the toasting chamber, and wherein the movement of the push rod in the second direction causes the first and second push claws to fold over and move beneath the slice of bread being toasted in the toasting chamber and the next slice to be toasted sitting on the uncovered part of the toasting shelf.

* * * * *